United States Patent [19]
Umezawa et al.

[11] 3,925,353
[45] Dec. 9, 1975

[54] 4-0-(6-ALKYLAMINO-6-DEOXY-ALPHA-D-HEXOPYRANOSYL)-DEOXYSTREPTAMINE DERIVATIVES AND THE PRODUCTION THEREOF

[75] Inventors: Hamao Umezawa; Sumio Umezawa, both of Tokyo; Osamu Tsuchiya, Yokohama, all of Japan

[73] Assignee: Zaidan Hojin Biseibutsu Kagaku Kenkyu Kai, Tokyo, Japan

[22] Filed: Aug. 22, 1973

[21] Appl. No.: 390,403

[30] Foreign Application Priority Data
Aug. 23, 1972 Japan.............................. 47-83671

[52] U.S. Cl............................ 260/210 AB; 424/180
[51] Int. Cl.$^2$........................................ C08B 19/00
[58] Field of Search....... 260/210 AB, 583 L, 210 K

[56] References Cited
UNITED STATES PATENTS
2,781,348  2/1957  Schlittler et al................. 260/583 L
3,796,699  3/1974  Naito et al..................... 260/210 AB

*Primary Examiner*—Johnnie R. Brown
*Assistant Examiner*—Cary Owens
*Attorney, Agent, or Firm*—James C. Haight

[57] ABSTRACT

6'-N-alkyl derivatives of kanamycin, 3',4'-dideoxykanamycin B, 3',4'-dideoxyneamine and 3',4'-dideoxyvistamycin, typically represented by 6'-N-methylkanamycin, 6'-N-methyl-3',4'-dideoxykanamycin B and 6'-N-methyl-3',4'-dideoxyvistamycin are synthetized by 6'-N-alkyltalation of the parent substances kanamycin, 3',4'-dideoxykanamycin B, 3',4'-dideoxynamine and 3',4'-dideoxyvistamycin and are new semi-synthetic antibiotics which are usefully active even against *Escherichia* and *Pseudomonas* species resistant to the parent substances.

6 Claims, No Drawings

4-0-(6-ALKYLAMINO-6-DEOXY-ALPHA-D-HEXOPYRANOSYL)-DEOXYSTREPTAMINE DERIVATIVES AND THE PRODUCTION THEREOF

This invention relates to a new and useful substance, a derivative of 4-0-(6-alkylamino-6-deoxy-$\alpha$-D-hexopyranosyl)-2-deoxystreptamine which is effective against drug-resistant bacteria. This invention also relates to a process of preparing said derivative.

Many aminoglycoside antibiotics are known and have been used widely as valuable, chemotherapeutic agents, but many drug-resistant strains which are resistant to the known aminoglycoside antibiotics have been reported in recent years. The mechanism of resistance of these drug-resistant bacteria to the known aminoglycoside antibiotics has been studied. For instance, one of the present inventors, H. Umezawa et al. have found that some R-factor carrying clinical isolated strains of the gram-negative bacteria *Staphylococcus aureus* and *Pseudomonas aeruginosa* are resistant to the action of kanamycins, and that these kanamycin-resistant strains are resistant because they produce an enzyme capable of phosphorylating the 3'-hydroxyl group of kanamycins and thereby inactivate the kanamycins. On the basis of this finding, H. Umezawa et al. have synthetized 3'-deoxykanamycin and 3', 4'-dideoxykanamycin B in which the 3'-hydroxyl group of the kanamycin molecule has been removed, as well as 3',-4'-dideoxyneamine and 3',4'-dideoxyvistamycin, e.g. (see the "Journal of Antibiotics" Ser. *A*, Vol. 21, pages 274 - 275 (1971); Vol. 24, pages 485–487; Vol. 24, pages 711–712 (1971); and Vol. 25, pages 613–617). Vistamycin was originally called Antibiotic SF-733 (see the "Journal of Antibiotics" Vol. 23, pages 173–183 (1970)), but is recently called ribostamycin. Although 3'-deoxykanamycin; 3',4'-dideoxykanamycin B; 3',4'-dideoxyneamine and 3',4'-dideoxyvistamycin are actually effective against the above-mentioned kanamycin-resistant strains, these deoxy-derivatives are not practically active against other kanamycin-resistant strains such as *Escherichia coli* K-12 R-5, *Pseudomonas aeruginosa* GN-315 etc., which have been isolated from other patients. H. Umezawa et al. have found that the latter kind of kanamycin-resistant strains are resistant because they produce an enzyme capable of acetylating the 6'-amino group of the kanamycins A and B; 3'-deoxykanamycin; 3',4'-di-deoxykanamycin B; 3',4'-dideoxyneamine; 3',4'-dideoxyvistamycin and other related aminoglycoside antibiotics containing the 4-0-(6-amino-6-deoxy-$\alpha$-D-hexopyranosyl)-2-deoxystreptamine moiety in the molecule thereof, and that these aminoglycoside antibiotics can be inactivated through the 6'-N-acetylation thereof under the action of said 6'-N-acetylating enzyme. In these circumstances, we have made our further research in an attempt to produce new derivatives of kanamycins, neamine and vistamycin (ribostamycin) which are effective even against the latter kind of drug-resistant strains producing the 6'-N-acetylating enzyme. In the course of our research, we have prepared derivatives of kanamycins, neamine and vistamycin in which the 6'-amino group thereof has been removed and replaced by a hydrogen atom, but we have found that such 6'-deamino derivatives no longer exhibit the antibacterial activity of the parent substance kanamycins, neamine and vistamycin respectively. Accordingly, we have considered it necessary to convert the 6'-amino group of the kanamycins, neamine and other related aminoglycoside antibiotics into a group which can be biologically acetylated only with difficulty and which can maintain the original antibacterial activity of the parent substances in order to obtain new and useful derivative of kanamycins, neamine and vistamycin which are effective against the class of the drug-resistant bacteria capable of producing the 6'-N-acetylating enzyme.

An object of this invention is to provide new and useful derivatives of kanamycins, neamine and vistamycin (ribostamycin) which are effective even against the class of drug-resistant bacteria capable of producing an 6'-N-acetylating enzyme. Another object of this invention is to provide a simple and efficient process for the production of such new and useful derivatives of kanamycins, neamine and vistamycin. Other objects of this invention will be clear from the following descriptions.

As a result of our extensive research, we have suceeded in synthetizing 6'-N-alkyl derivatives of aminoglycoside antibiotics containing the 4-0-(6-amino-6-deoxy-$\alpha$-D-hexopyranosyl)-2-deoxystreptamine moiety in the molecule thereof, such as kanamycins, neamine, vistamycin and the line, We have now found that the 6'-N-alkyl derivatives so synthetized exhibit useful antibacterial activity even against the drug-registant bacteria such as *Escherichia coli* K-12 R-5 and *Pseudomonas aeruginosa* GN 315.

According to a first aspect of this invention, therefore, there is provided a process of preparing a 4-0-(6-alkylamino-6-deoxy-$\alpha$-D-hexopyranosyl)-5-0-substituted or -6-0-substituted-2-deoxystreptamine of the formula:

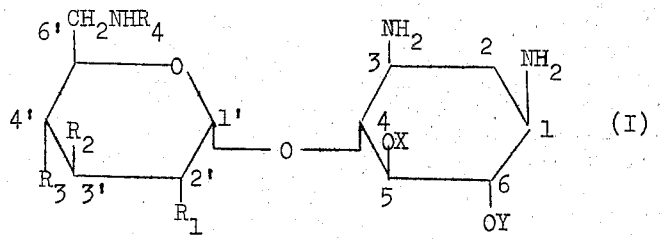

wherein $R_1$ is a hydroxyl or amino group; $R_2$ and $R_3$ are both a hydrogen atom or a hydroxyl group; $R_4$ is an alkyl group of 1–4 carbon atoms; X is a hydrogen atom or $\beta$-D-ribosyl group; and Y is a hydrogen atom or 3-amino-3-deoxy-$\alpha$-D-glucopyranosyl group, which comprises 6'-N-alkylating in a known manner a 4-0-(6-amino-6-deoxy-$\alpha$-D-hexopyranosyl)-5-0-substituted or -6-substituted-2-deoxystreptamine of the formula:

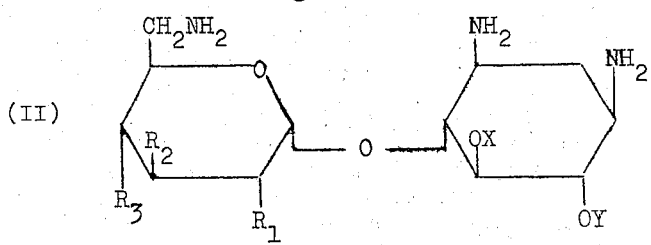
(II)

wherein $R_1$, $R_2$, $R_3$, X and Y have the same meanings as defined above.

In the process of this invention, the 6'-N-alkylation of the starting compound of the formula (II) may be conducted in various known ways.

For instance, the starting compound of the formula (II) may be 6'-N-alkylated selectively in such a manner that the compound (II) is reacted with an acylating agent such as an acyl halide of the formula:

$$R_4\text{—COZ} \quad \quad (IV)$$

wherein $R_4$ is an alkyl group of 1–3 carbon atoms and Z is a halogen atom such as chlorine or bromine, or the corresponding acid anhydride thereof, or a compound of the formula:

$$R_5\text{—OCOZ'} \quad \quad (V)$$

wherein $R_5$ is an alkyl, aralkyl or aryl group and Z' is a chlorine atom, an aryloxy group or succiniminoxy group, for the acylation of one or more amino groups present in the molecule of the compound (II). Among the many amino groups of the compound (II), the 6'-amino group has been assumed to be the most reactive to the acylating agent, so that the 6'-N-acylated derivative of the compound (II) is formed preferentially when the compound (II) is treated with the acylating agent as stated above. The 6'-N-acylated derivative (III) so formed may then be hydrogenated in a known manner such as using lithium aluminum hydride or diborane to produce the desired compound of the formula (I).

We have now found that substantially selective 6'-N-methylation of the starting compound of the formula (II) may be achieved with success when the compound (II) is N-carbobenzyloxylated by reacting with benzyloxycarbonyl chloride benzyl p-nitrophenyl carbonate or N-(benzyloxycarbonyloxy) succinimide to effect selective formation of the 6'-N-benzyloxycarbonyl derivative of the compound (II), which is subsequently subjected to hydrogenolysis with lithium aluminum hydride or diborane in solution in an inert organic solvent such as tetrahydrofuran to afford the 6'-methylamino derivative of the compound (II), that is, the compound of the formula (I) in which $R_4$ is methyl.

As an embodiment of the process of this invention, therefore, there is provided a process of producing a compound of the above formula (I) where $R_4$ is methyl, which comprises 6'-N-methylating a compound of formula (II) by reacting this compound with benzyloxycarbonyl chloride, benzyl p-nitrophenyl carbonate or N-(benzyloxycarbonyloxy) succinimide to prepare the 6'-N-benzyloxycarbonyl derivative of the compound (II), and then treating this 6'-N-benzyloxycarbonyl derivative with lithium aluminum hydride or diborane to give the 6'-N-methyl derivative of the compound (II), that is, a compound of the formula (I) where $R_4$ is methyl.

As the compound of the formula (I) produced by the process of this invention is new and useful substance, there is provided according to a second aspect of this invention a 4-O-(6-alkylamino-6-deoxy-α-D-hexopyranosyl)-5-O-substituted or -6-O-substituted -2-deoxystreptamine of the formula:

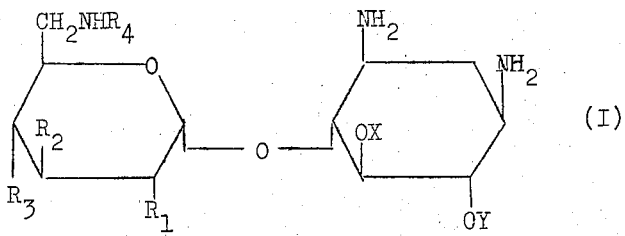
(I)

wherein $R_1$ is a hydroxyl or amino group; $R_2$ and $R_3$ are both a hydrogen atom or hydroxyl group; $R_4$ is an alkyl group of 1–4 carbon atoms; X is a hydrogen atom or β-D-ribosyl group; and Y is a hydrogen atom or 3-amino-3-deoxy-α-D-glucopyranosyl group, and the pharmaceutically acceptable acid-addition salts thereof.

Examples of the compound of the formula (I) are listed below.

1. 4-O-(6-methylamino-2-amino-2,3,4,6-tetradeoxy-α-D-erythro-hexopyranosyl)-2-deoxystreptamine, namely 6'-N-methyl-3'-4'-dideoxyneamine.
2. 4-O-(6-methylamino-6-deoxy-α-D-glucopyranosyl)-6-O-(3-amino-3-deoxy-α-D-glucopyranosyl)-2-deoxystreptamine, namely 6'-N-methyl-kanamycin.
3. 4-O-(6-methylamino-2-amino-2,3,4,6-tetradeoxy-α-D-erythro-hexopyranosyl)-6-O-(3-amino-3-deoxy-α-D-glucopyranosyl)-2-deoxystreptamine, namely 6'-N-methyl-3',4'-dideoxykanamycin B.
4. 4-O-(6-methylamino-2-amino-2,3,4,6-tetradeoxy-α-D-erythro-hexopyranosyl)-5-O-β-D-ribofuranosyl-2-deoxystreptamine, namely 6'-N-methyl-3',4'-dideoxyvistamycin.

Examples of the pharmaceutically acceptable acid-addition salts of the compounds of the formula (I) include the hydrochloride, sulfate, phosphate, acetate, maleate, fumarate, succinate, tartrate, oxalate, citrate, methanesulfonate, ethanesulfonate, N,N'-dibenzylethylene diamine and the like.

The compounds of the formula (I) show a high antibacterial activity to the same degree as the parent compounds of the formula (I), against most of bacteria tested. Moreover, the compounds of the formula (I) show effective antibacterial activity against all or portion of the above-mentioned drug-resistant strains. In Table 1 below are shown antibacterial spectra of 6'-N-methyl-3'-4'-dideoxyneamine (abbreviated as NMDNE); 6'-N-methylkanamycin (abbreviated as NMKM); 6'-N-methyl-3'-4'-dideoxykanamycin B (abbreviated as NMDKB) and 6'-N-methyl-3',4'-dideoxyvistamycin (abbreviated as NMDV). For comparison, the antibacterial spectra of 3',4'-dideoxyneamine (abbreviated as DNE), kanamycin A (abbreviated as KM), 3',4'-dideoxykanamycin B (abbreviated as DKB) and 3',4'-dideoxyvistamycin (abbreviated as DV) are also shown in Table 1. The minimum inhibitory concentration (mcg/ml) was measured according to a standard serial dilution method using nutrient agar culture medium at 37°C, the estimation being effected after 18 hours incubation.

The compounds of the formula (I) according to this invention are of a toxicity to animals and men, as shown by the fact that it shows a $LD_{50}$ value of more than 150 mg/kg upon intravenous injection of the compound in mice. In addition, the compounds of this invention exhibit a high antibacterial activity against various gram-positive and gram-negative bacteria, including the kanamycin-resistant strains, so that the compounds of this invention are useful in the treatment of infections caused by gram-positive and gram-negative bacteria. The compounds of this invention may be administered orally using any pharmaceutical form known to the art for such oral administration. Examples of pharmaceutical forms for oral administration are powders, capsules, tablets, syrups and the like. A suitable dose of the compounds for the effective treatment of bacterial infections is 0.25–2g. per person a day when given orally. It is preferred that said dose should be orally administered in three to four aliquots per day. The compounds of this invention may also be administered by intramuscular injection at a dosage of 50–200 mg. per person once or twice a day. Moreover, the compounds of the invention may be formulated into an ointment for external application which contains a compound of this invention at a concentration of 0.5–5% by weight in mixture with a known ointment base such as polyethylene glycol.

The invention is now illustrated with reference to the following Examples, to which the invention is not limited in any way.

EXAMPLE 1

Synthesis of 6'-N-methylkanamycin

Kanamycin free base (in the above-mentioned formula II, $R_1=R_2=R_3=OH$; X=H and Y=3-amino-3-deoxy-$\alpha$-D-glucopyranosyl group) (2 g.) was dissolved in 80 ml. of a liquid mixture of water and dioxane (1:2 by volume) to prepare a solution to which 1.24 g. of benzyl p-nitrophenyl carbonate ($C_6H_5CH_2O$—$COOC_6H_4NO_2$) was then added. The resulting admixture was stirred at 0°C for 5 hours. The reaction mixture was then concentrated to dryness under reduced pressure, and the solid so obtained was extracted with water. The resulting aqueous solution was concentrated and the concentrated solution was chromatographed by passing through a column of a cation-exchange resin consisting essentially of a copolymer of methacrylic acid with divinylbenzene in the form of ammonium salt (commercially available under a registered trade name "Amberlite" IRC 50, a product of Rohm & Haas Co., U.S.A.). The eluation was made

Table 1

| Test Microorganism | | Minimum Inhibitory Concentrations (meg/ml) | | | | | | | |
|---|---|---|---|---|---|---|---|---|---|
| | | NMDNE | NMKM | NMDKB | NMDV | DNE | KM | DKB | DV |
| Staphylococcus aureus FDA 209P | | 3.12 | 1.56 | 0.78 | 12.5 | 3.12 | 1.56 | 0.78 | 6.25 |
| Escherichia coli | K-12 | 6.25 | 0.78 | 1.56 | 6.25 | 6.25 | 0.78 | 0.39 | 3.12 |
| " | K-12 R-5 | 12.5 | 1.56 | 3.12 | 6.25 | 50 | 25 | 25 | 50 |
| " | K-12 ML 1629 | 12.5 | >100 | 3.12 | >100 | 6.25 | 100 | 1.56 | >100 |
| " | LA 290 R 55 | 100 | 12.5 | 25 | 12.5 | 50 | 50 | 12.5 | 6.25 |
| " | LA 290 R 56 | 25 | 3.12 | 6.25 | 6.25 | 12.5 | 12.5 | 12.5 | 6.25 |
| Pseudomonas aeruginosa | A3 | 25 | >100 | 3.12 | 6.25 | 12.5 | 50 | 3.12 | 6.25 |
| " | GN 315 | 50 | >100 | 12.5 | >100 | >100 | >100 | >100 | >100 | using 0.025N aqueous ammonia and the active fraction of the eluate was collected and concentrated to dryness to give a solid. Yield 1.5 g., mp. 218° – 219°C. $[\alpha]_D^{18}$ + 108° (c 1.4, water).

One gram of this solid product 6'-N-benzyloxycarbonylkanamycin (in the formula I, $R_1=R_2=R_3=OH$; $R_4=COOCH_2C_6H_5$; X=H and Y=3-amino-3-deoxy-$\alpha$-D-glucopyranosyl group) was suspended in 40 ml. of tetrahydrofuran and the resulting suspension was admixed with 0.61 g. of lithium aluminum hydride. The admixture was heated for 20 hours under reflux to effect the hydrogenolysis of the 6'-N-benzyloxycarbonylkanamycin to give 6'-N-methylkanamycin. The reaction mixture was poured into a large volume of water to precipitate a solid which was subsequently removed by centrifugation. The aqueous layer (the filtrate) was concentrated. When the concentrated aqueous solution was admixed with anisaldehyde, there was deposited a precipitate which essentially consisted of the Schiff base formed by the interaction of the 6'-N-methylkanamycin and anisaldehyde. This precipitate was removed and washed with petroleum ether and then dissolved in chloroform. The solution was, after washing with water, treated with 0.2N hydrochloric acid to decompose the Schiff base and to regenerate the 6'-N-methylkanamycin. The resulting acidic aqueous solution containing 6'-N-methylkanamycin was concentrated and then passed into a column of a strongly basic anion-exchange resin essentially consisting of a polystyrene containing quaternary ammonium groups —N—$(CH_3)_3OH$ as the functional groups thereof (commercially available under a registered trade name "Amberlite" IRA 400, a product of Rohm & Haas Co., U.S.A.). The column was chromatographically developed with water. The fractions of the eluate which contained the desired compound were collected, and the combined solution was concentrated. When the concentrated solution was chromatographed in a column of a molecular sieve essentially consisting of a three-dimensional network gel of dextran containing carboxymethyl functions as the weakly acidic ion-exchanger functional group (commercially available under a registered trade name "CM-Sephadex" C-25, a product of Pharmacia Co, Sweden) with 0.02 – 0.1N aqueous ammonia as the developing solvent, there was afforded a solid of the desired 6'-N-methylkanamycin in the form of the free base. Yield 0.21 g. $[\alpha]_D^{18} + 136°$ (c 1, water); Nuclear magnetic resonance spectrum (in $D_2O$): $\tau$ 7.58 (3H singlet, $NCH_3$).

Elemental analysis. Found: C 44.83, H 7.70 N 11.05% Calculated for $C_{19}H_{38}N_4O_{11} \cdot \frac{1}{2} H_2O$: C 44.96, H 7.74, N 11.04%

EXAMPLE 2

Synthesis of 6'-N-methyl-3',4'-dideoxykanamycin

3',4'-Dideoxykanamycin B (in formula II $R_1=NH_2$; $R_2=R_3=H$; X=H and Y=3-amino-3-deoxy-$\alpha$-D-glucopyranosyl group) (2g.) was dissolved in 80 ml. of a liquid mixture of water and dioxane (1:2 by volume) to prepare a solution to which 1.38 g. of benzyl p-nitrophenyl carbonate was subsequently added. The admixture was stirred at 0°C for 5 hours. The reaction mixture was then processed in the same manner as described in the first half of Example 1 to give a solid. Yield 1.2 g., mp. 130°–131°C, and $[\alpha]_D^{18} + 110°$ (c 1, water).

One gram of this solid of 6'-N-benzyloxycarbonyl-3',4'-dideoxykanamycin B (in formula I, $R_1=NH_2$; $R_2=R_3=H$; $R_4=COOCH_2C_6H_5$; X=H and Y=3-amino-3-deoxy-$\alpha$-D-glucopyranosyl group) was suspended in 30 ml. of tetrahydrofuran and the resulting suspension was processed in the same manner as described in the second half of Example 1 to afford the desired compound 6'-N-methyl-3',4'-dideoxykanamycin B. Yield 0.21 g., $[\alpha]_D^{18} + 128°$ (c 1, water). Nuclear magnetic resonance spectrum: $\tau$ 7.65 (3H singlet, $NCH_3$).

Elemental analysis. Found: C 47.44, H 8.56, N 14.37% Calculated for $C_{19}H_{39}N_5O_8 \cdot H_2O$: C 47.19, H 8.55, N 14.48%

EXAMPLE 3

Synthesis of 6'-N-methyl-3',4'-dideoxyneamine

3',4'-Dideoxyneamine (in formula II, $R_1=NH_2$; $R_2=R_3=H$; and X=Y=H) (2 g.) was dissolved in 80 ml. of a liquid mixture of water and dioxane (1:2 by volume) to prepare a solution to which 1.4 g. of benzyloxycarbonyl chloride was subsequently added. The admixture was stirred at 0°C for 1 hour. The reaction mixture was then processed in the same manner as described in the first half of Example 1 to give a solid. Yield 1.65 g., mp. 225°–227°C (with decomposition), and $[\alpha]_D^{20} + 75°$ (c 1, water).

One gram of this solid of 6'-N-benzyloxycarbonyl-3'-4'-dideoxyneamine (in formula I, $R_1=NH_2$; $R_2=R_3=H$; $R_4=COOCH_2C_6H_5$; and X=Y=H) was suspended in 30 ml. of tetrahydrofuran and the resulting suspension was processed in the same manner as in the second half of Example 1 to afford the desired compound 6'-N-methyl-3',4'-dideoxyneamine. Yield 0.35 g., $[\alpha]_D^{18} + 77°$ (c 1, water).

Elemental analysis. Found: C 44.03, H 8.21, N 14.77% Calculated for $C_{13}H_{28}N_4O_4 \cdot H_2O \cdot H_2CO_3$: C 43.74, H 8.39, N 14.58%

EXAMPLE 4

Synthesis of 6'-N-methyl-3',4'-dideoxyvistamycin

3',4'-Dideoxyvistamycin (in formula II, $R_1=NH_2$; $R_2=R_3=H$; X=$\beta$-D-ribofranosyl; and Y=H) (2 g.) was dissolved in 80 ml. of a liquid mixture of water and dioxane (1:2 by volume) to prepare a solution to which 1.15 g. of N-(benzyloxycarbonyloxy) succinimide was subsequently added. The admixture was stirred at 0°C for 1 hour. The reaction mixture was then processed in the same manner as described in the first half of Example 1 to give a solid. Yield 1.2 g., mp. 181°–185°C (with decomposition), and $[\alpha]_D^{20} + 21°$ (c 1, water).

One gram of this solid of 6'-N-benzyloxycarbonyl-3',4'-dideoxyvistamycin (in formula I, $R_1=NH_2$; $R_2=R_3=H$; $R_4=COOCH_2C_6H_5$; X=$\beta$-D-ribofranosyl; and Y=H) was suspended in 30 ml. of tetrahydrofuran and the resulting suspension was processed in the same manner as in the second half of Example 1 to afford the desired compound 6'-N-methyl-3',4'-dideoxyvistamycin. Yield 0.23 g., $[\alpha]_D^{18} +28°$ (c 1, water).

Elemental analysis. Found: C 44.33, H 7.89, N 11.14% Calculated for $C_{13}H_{36}N_4O_8 \cdot H_2O \cdot H_2CO_3$: C 44.17, H 7.80, N 10.85%

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of this invention to adapt it to various usage conditions.

What we claim is:

1. A compound of the formula:

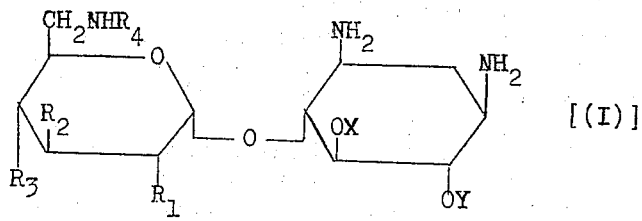

[(I)]

wherein $R_1$ is hydroxyl or amino; $R_2$ and $R_3$ are both hydrogen or hydroxyl; $R_4$ is alkyl of 1–4 carbon atoms; X is hydrogen or $\beta$-D-ribosyl; and Y is hydrogen or 3-amino-3-deoxy-$\alpha$-D-glucopyranosyl, and the pharmaceutically acceptable acid-addition salts thereof.

2. A compound selected froom the group consisting of 6'-N-methyl-3',4'-dideoxyneamine; 6'-N-methylkanamycin; 6'-N-methyl-3',4'-dideoxykanamycin B and 6'-N-methyl-3',4'-dideoxyvistamycin.

3. 6'-N-methylkanamycin.
4. 6'-N-methyl-3',4'-dideoxykanamycin B.
5. 6'-N-methyl-3',4'-dideoxyneamine.
6. 6'-N-methyl-3',4'-dideoxyvistamycin.

* * * * *